US009851262B2

(12) United States Patent
Nagatomo et al.

(10) Patent No.: US 9,851,262 B2
(45) Date of Patent: Dec. 26, 2017

(54) TEMPERATURE SENSOR

(71) Applicant: MITSUBISHI MATERIALS CORPORATION, Tokyo (JP)

(72) Inventors: Noriaki Nagatomo, Naka (JP); Hitoshi Inaba, Naka (JP); Hiroshi Tanaka, Naka (JP); Kazuta Takeshima, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 328 days.

(21) Appl. No.: 14/425,605

(22) PCT Filed: Sep. 3, 2013

(86) PCT No.: PCT/JP2013/074441
§ 371 (c)(1),
(2) Date: Mar. 3, 2015

(87) PCT Pub. No.: WO2014/038719
PCT Pub. Date: Mar. 13, 2014

(65) Prior Publication Data
US 2015/0226616 A1 Aug. 13, 2015

(30) Foreign Application Priority Data

Sep. 6, 2012 (JP) ................. 2012-195713

(51) Int. Cl.
*H01C 7/02* (2006.01)
*G01K 7/22* (2006.01)
(Continued)

(52) U.S. Cl.
CPC .............. *G01K 7/22* (2013.01); *G01K 13/08* (2013.01); *H01C 1/14* (2013.01); *H01C 1/1413* (2013.01);
(Continued)

(58) Field of Classification Search
CPC . H01C 7/04; H01C 7/041; H01C 1/14; H01C 1/1413; H01C 7/006; H01C 7/008
(Continued)

(56) References Cited

U.S. PATENT DOCUMENTS 6,544,458 B1 * 4/2003 Hansma .................... B22C 1/00
264/234
6,989,574 B2 * 1/2006 Parsons .................. H01C 7/022
257/417
(Continued)

FOREIGN PATENT DOCUMENTS

JP S61173101 U 10/1986
JP 06-300644 A 10/1994
(Continued)

OTHER PUBLICATIONS

JP2012068131, Apr. 5, 2012, Applicant submitted. EPO English translation.*
(Continued)

*Primary Examiner* — Kyung Lee
(74) *Attorney, Agent, or Firm* — Lock Lord LLP

(57) ABSTRACT

The temperature sensor is provided with a pair of lead frames, a sensor portion connected to the pair of lead frames, and an insulating holding portion which is fixed to the pair of lead frames and holds the lead frames. The sensor portion is provided with an insulating film; a thin film thermistor portion formed as a pattern on the surface of the insulating film with a thermistor material; a pair of interdigitated electrodes formed as patterns having multiple comb portions and facing each other on the thin film thermistor portion; and a pair of pattern electrodes connected to the pair of interdigitated electrodes and formed as patterns on the surface of the insulating film. The pair of lead frames is extended and adhered to the surface of the insulating film disposing the (Continued)

thin film thermistor portion therebetween and is connected to the pair of pattern electrodes.

5 Claims, 13 Drawing Sheets

(51) Int. Cl.
    *H01C 7/04*         (2006.01)
    *G01K 13/08*      (2006.01)
    *H01C 7/00*         (2006.01)
    *H01C 1/14*         (2006.01)

(52) U.S. Cl.
    CPC ............ *H01C 7/006* (2013.01); *H01C 7/008* (2013.01); *H01C 7/04* (2013.01); *H01C 7/041* (2013.01)

(58) Field of Classification Search
    USPC .................................................. 338/22 R, 25
    See application file for complete search history.

(56) References Cited

U.S. PATENT DOCUMENTS

| 2004/0224459 A1* | 11/2004 | Nishikawa | .............. C30B 23/02 |
| | | | 438/202 |
| 2010/0104495 A1* | 4/2010 | Kawabata | ................ C30B 7/10 |
| | | | 423/409 |
| 2014/0193623 A1* | 7/2014 | Setoyama | ............... B23B 27/14 |
| | | | 428/216 |
| 2015/0036723 A1* | 2/2015 | Fujita | ....................... H01C 7/04 |
| | | | 374/185 |

FOREIGN PATENT DOCUMENTS

| JP | H10239170 A | 9/1998 |
| JP | 11-121207 A | 4/1999 |
| JP | 2000-074752 A | 3/2000 |
| JP | 2000-162052 A | 6/2000 |
| JP | 2004-319737 A | 11/2004 |
| JP | 2011044621 A | 3/2011 |
| JP | 2012-068131 A | 4/2012 |
| JP | 2012068116 A | 4/2012 |

OTHER PUBLICATIONS

JP2004319737, Nov. 11, 2004, Applicant submitted. EPO English translation.*
JP2011044621, Mar. 3, 2011, Applicant submitted. EPO English translation.*
Supplementary European Search Report dated May 4, 2016, issued for the European patent application No. 13 83 4457.7.
International Search Report dated Oct. 31, 2013 for PCT/JP2013/074441.
Office Action dated Jun. 2, 2016, issued for the Chinese patent application No. 201380040118.0 and English translation thereof.

* cited by examiner

TEMPERATURE SENSOR

CROSS-REFERENCE TO RELATED APPLICATIONS

This application is a U.S. National stage application of PCT International Application No. PCT/JP2013/074441 filed Sep. 3, 2013, which claims the benefit of Japanese Patent Application No. 2012-195713, filed Sep. 6, 2012, the entire contents of the aforementioned applications are hereby incorporated herein by reference.

BACKGROUND OF THE INVENTION

Field of the Invention

The present invention relates to a temperature sensor which is preferably used for measuring the temperature of a heating roller in a copier, a printer, or the like and has excellent responsiveness.

Description of the Related Art

In general, a temperature sensor for measuring the temperature of a heating roller used in a copier or a printer is placed in contact with the heating roller. As such a temperature sensor, for example, Patent Documents 1 and 2 disclose a temperature sensor that has a pair of lead frames, a thermal sensing element which is disposed between and connected to these lead frames, a holding portion formed at the ends of the pair of lead frames, and a thin film sheet which is provided at one side of the lead frames and the thermal sensing element to be brought into contact with the heating roller.

Such a temperature sensor is brought into contact with the surface of the heating roller using the elastic force of the lead frames so as to detect the temperature of the heating roller.

In Patent Document 1, a bead type thermistor or a chip thermistor is employed as the thermal sensing element. In Patent Document 2, a thin film thermistor in which a thermal sensing film is formed on one surface of an insulating substrate such as alumina is employed as the thermal sensing element. The thin film thermistor consists of a thermal sensing film formed on one surface of an insulating substrate, a pair of lead portions for connecting the thermal sensing film to a pair of lead frames, and a protective film covering the thermal sensing film.

PRIOR ART DOCUMENTS

Patent Documents

[Patent Document 1] Japanese Examined Patent Application Publication No. H6-29793
[Patent Document 2] Japanese Unexamined Patent Application Publication No. 2000-74752
[Patent Document 3] Japanese Unexamined Patent Application Publication No. 2004-319737

SUMMARY OF THE INVENTION

Problems to be Solved by the Invention

The following problems still remain in the conventional techniques described above.

Specifically, in the technique disclosed in Patent Document 1, a bead type thermistor or the like is used as the thermal sensing element. In this case, the bead type thermistor or the like is spherical or ellipsoidal having a diameter of about 1 mm, and thus, is brought into point contact with the heating roller, resulting in a difficulty in accurate temperature detection. In addition, the bead type thermistor or the like has a large volume, resulting in deterioration in responsiveness. Furthermore, point contact may lead to the formation of scratch marks on the surface of the roller in rotation.

In the technique disclosed in Patent Document 2, a thin film thermistor is used as the thermal sensing element, and thus, can be brought into surface contact with the heating roller. However, the thin film thermistor has a large volume when considering the insulating substrate and the lead portions constituting thereof, resulting in deterioration in responsiveness.

The present invention has been made in view of the aforementioned circumstances, and an object of the present invention is to provide a temperature sensor with excellent responsiveness when pressed against a heating roller or the like to detect the temperature.

Means for Solving the Problems

The present invention adopts the following structure in order to solve the aforementioned problems. Specifically, a temperature sensor according to a first aspect of the present invention is characterized in that the temperature sensor includes a pair of lead frames; a sensor portion connected to the pair of lead frames; and an insulating holding portion which is fixed to the pair of lead frames and holds the lead frames, wherein the sensor portion further includes an insulating film; a thin film thermistor portion formed as a pattern on the surface of the insulating film with a thermistor material; a pair of interdigitated electrodes formed as patterns having multiple comb portions and facing each other on at least one of the top or the bottom of the thin film thermistor portion; and a pair of pattern electrodes connected to the pair of interdigitated electrodes and formed as patterns on the surface of the insulating film, and wherein the pair of lead frames is extended and adhered to the surface of the insulating film disposing the thin film thermistor portion therebetween and is connected to the pair of pattern electrodes.

Since, in the temperature sensor, the pair of lead frames is extended and adhered to the surface of the insulating film disposing the thin film thermistor portion therebetween, the sensor portion may be supported by the pair of lead frames while ensuring the rigidity of the insulating film. The entire thickness of the temperature sensor may be thinned by the presence of the thin film thermistor portion directly formed on the insulating film supported by the lead frames, so that the temperature sensor may exhibit excellent responsiveness in a small volume thereof. Since the pair of lead frames is connected to the pair of pattern electrodes, the thin film thermistor portion and the lead frames are connected to each other via the pattern electrodes directly formed on the insulating film, so that the influence of thermal conductivity with the lead frames is suppressed by a patterned thin wiring as compared with the case where the thin film thermistor portion and the lead frames are connected to each other via lead wires or the like. Since the temperature sensor has high flatness over the contact area against a measurement object and thus is brought into surface contact therewith, accurate temperature detection may be achieved and the surface of the measurement object such as a heating roller or the like in rotation is less prone to be damaged.

A temperature sensor according to a second aspect of the present invention is characterized in that the insulating film is generally rectangular, the pair of lead frames extends across substantially the entire length in the extending direction of the insulating film, the thin film thermistor portion is arranged at one end of the insulating film, and the pattern electrodes are formed extending from one end to the other end of the insulating film and are connected to the lead frames at the other end of the insulating film, respectively, according to the first aspect of the present invention.

Specifically, since, in the temperature sensor, the pattern electrodes are formed extending from one end to the other end of the insulating film and are connected to the lead frames at the other end of the insulating film, respectively, the thin pattern electrodes extend in an elongated manner and the connection between the pattern electrodes and the lead frames is set to be away from the thin film thermistor portion, heat transfer to the lead frames may further be suppressed, resulting in highly accurate temperature measurement with excellent responsiveness.

A temperature sensor according to a third aspect of the present invention is characterized in that the pair of pattern electrodes is formed in a meander shape according to the second aspect of the present invention.

Specifically, since, in the temperature sensor, the pair of pattern electrodes is formed in a meander shape, the length of the pattern electrodes increases, resulting in suppression of thermal conductivity to the lead frames.

A temperature sensor according to a fourth aspect of the present invention is characterized in that an insulating protective sheet covering at least the lead frames is adhered to the surface of the insulating film according to any one of the first to third aspects of the present invention.

Specifically, since, in the temperature sensor, an insulating protective sheet covering at least the lead frames is adhered to the surface of the insulating film, the lead frames may be stably held by sandwiching it between the insulating film and the protective sheet and the rigidity of the insulating film may improve.

A temperature sensor according to a fifth aspect of the present invention is characterized in that the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), and the crystal structure thereof is a hexagonal wurtzite-type single phase according to any one of the first to fourth aspects of the present invention.

In general, there has been a requirement for a thermistor material used for a temperature sensor or the like to exhibit a high B constant so as to obtain a high precision and high sensitivity temperature sensor. Conventionally, transition metal oxides such as Mn, Co, Fe, and the like are typically used as such thermistor materials. These thermistor materials need to be fired at a temperature of 600° C. or greater in order to obtain a stable thermistor characteristic.

In addition to thermistor materials consisting of metal oxides as described above, Patent Document 3 discloses a thermistor material consisting of a nitride represented by the general formula: $M_xA_yN_z$ (where M represents at least one of Ta, Nb, Cr, Ti, and Zr, A represents at least one of Al, Si, and B, $0.1 \leq x \leq 0.8$, $0 < y \leq 0.6$, $0.1 \leq z \leq 0.8$, and $x+y+z=1$). In Patent Document 3, only a Ta—Al—N-based material represented by $M_xA_yN_z$ (where $0.5 \leq x \leq 0.8$, $0.1 \leq y \leq 0.5$, $0.2 \leq z \leq 0.7$, and $x+y+z=1$) is described in Examples. The Ta—Al—N-based material is produced by sputtering in a nitrogen gas-containing atmosphere using a material containing the elements as set forth as a target. The obtained thin film is subject to a heat treatment at a temperature from 350 to 600° C. as required.

In recent years, the development of a film-type thermistor sensor made of a thermistor material on a resin film has been considered, and thus, it has been desired to develop a thermistor material which can be directly deposited on a film. Specifically, it is expected to obtain a flexible thermistor sensor by using a film. Furthermore, although it is desired to develop a very thin thermistor sensor having a thickness of about 0.1 mm, a substrate material using a ceramics material such as alumina has often conventionally used. For example, if the substrate material is thinned to a thickness of 0.1 mm, the substrate material is very fragile and easily breakable. Thus, it is expected to obtain a very thin thermistor sensor by using a film.

Conventionally, in a temperature sensor formed by a nitride-based thermistor consisting of TiAlN, when a nitride-based thermistor is formed by laminating a thermistor material layer consisting of TiAlN and electrodes on the surface of a film, an electrode layer such as Au is deposited on the thermistor material layer, wherein the electrode layer is patterned into a comb shape having multiple comb portions. However, if the thermistor material layer is gently bent with a large radius of curvature, cracks are not easily generated in the thermistor material layer, resulting in no change in electric properties such as a resistance value, whereas if the thermistor material layer is severely bent with a small radius of curvature, cracks are easily generated in the thermistor material layer, resulting in a decrease in reliability of electric properties due to a large change in resistance value or the like. In particular, if the film is severely bent with a small radius of curvature in a direction perpendicular to the extending direction of the comb portions, cracks are easily generated near the edge of electrodes due to a difference in stress between the interdigitated electrodes and the thermistor material layer as compared with the case where the film is bent in the extending direction of the comb portions, resulting in an undesirable decrease in reliability of electric properties.

In addition, a film made of a resin material typically has a low heat resistance temperature of 150° C. or lower, and even polyimide which is known as a material relatively having a high heat resistance temperature only has a heat resistance temperature of about 300° C. Hence, when a heat treatment is performed in steps of forming a thermistor material, it has been conventionally difficult to use such a thermistor material. The above conventional oxide thermistor material needs to be fired at a temperature of 600° C. or higher in order to realize a desired thermistor characteristic, so that a film-type thermistor sensor which is directly deposited on a film cannot be realized. Thus, it has been desired to develop a thermistor material which can be directly deposited on a film without baking. However, even in the thermistor material disclosed in Patent Document 3, there has remained the need to perform a heat treatment for the obtained thin film at a temperature from 350 to 600° C. as required in order to obtain a desired thermistor characteristic. As the thermistor material, although a material having a B constant of about 500 to 3000 K was obtained in Examples of a Ta—Al—N-based material, there is no description regarding heat resistance, and thus, the thermal reliability of a nitride-based material has been unknown.

The present inventors' serious endeavor by focusing on an AlN-based material among nitride materials found that the AlN-based material having a good B constant and exhibiting excellent heat resistance may be obtained without baking by substituting Al-site with a specific metal element for improving electric conductivity and by ordering it into a specific crystal structure because AlN is an insulator and it is difficult for AlN to obtain an optimum thermistor characteristic (B constant: about 1000 to 6000 K).

Thus, the present invention has been obtained on the basis of the above finding. Since the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal wurtzite-type single phase, the metal nitride material having a good B constant and exhibiting excellent heat resistance may be obtained without baking.

Note that, when the value "$y/(x+y)$" (i.e., $Al/(Ti+Al)$) is less than 0.70, a wurtzite-type single phase is not obtained but two coexist phases of a wurtzite-type phase and a NaCl-type phase or a single phase of only a NaCl-type phase may be obtained, so that a sufficiently high resistance and a high B constant cannot be obtained.

If the ratio of "$y/(x+y)$" (i.e., $Al/(Ti+Al)$) exceeds 0.95, the metal nitride material exhibits very high resistivity and extremely high electrical insulation, so that the metal nitride material is not applicable as a thermistor material.

If the ratio of "$z$" (i.e., $N/(Ti+Al+N)$) is less than 0.4, the amount of nitrogen contained in the metal is small, so that a wurtzite-type single phase cannot be obtained. Consequently, a sufficiently high resistance and a high B constant cannot be obtained.

Furthermore, if the ratio of "$z$" (i.e., $N/(Ti+Al+N)$) exceeds 0.5, a wurtzite-type single phase cannot be obtained. This is because a correct stoichiometric ratio of $N/(Ti+Al+N)$ in a wurtzite-type single phase when there is no defect at nitrogen-site is 0.5.

Effects of the Invention

According to the present invention, the following effects may be provided.

Specifically, according to the temperature sensor of the present invention, since the pair of lead frames is extended and adhered to the surface of the insulating film disposing the thin film thermistor portion therebetween and is connected to the pair of pattern electrodes, the temperature sensor may not only exhibit excellent responsiveness by the presence of the thin film thermistor portion and the thin pattern electrodes both directly formed on the insulating film but also perform temperature measurement with accuracy.

Furthermore, the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), and the crystal structure thereof is a hexagonal wurtzite-type single phase, the metal nitride material having a good B constant and exhibiting excellent heat resistance may be obtained without baking.

Thus, the temperature sensor of the present invention may not only have a flexible surface contact by the presence of the lead frames and the insulating film but also perform accurate temperature measurement with a high responsiveness, and thus, is preferably used for measuring the temperature of a heating roller in a copier, a printer, or the like.

BEST MODES FOR CARRYING OUT THE INVENTION

Hereinafter, a description will be given of a film-type thermistor sensor according to a first embodiment of the present invention with reference to FIGS. 1 to 6. In a part of the drawings used in the following description, the scale of each component is changed as appropriate so that each component is recognizable or is readily recognized.

Figure 1:
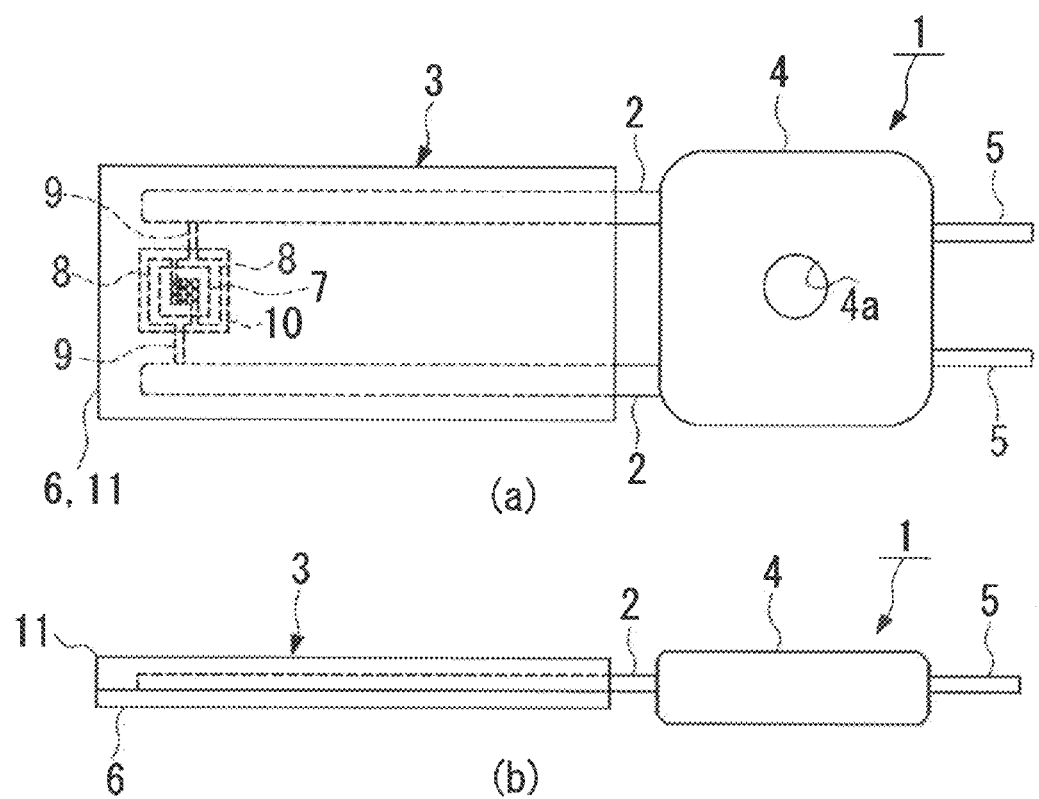
FIG. 1 is an example of a plan view and a front view illustrating a temperature sensor according to a first embodiment of the present invention.
Figure 2:
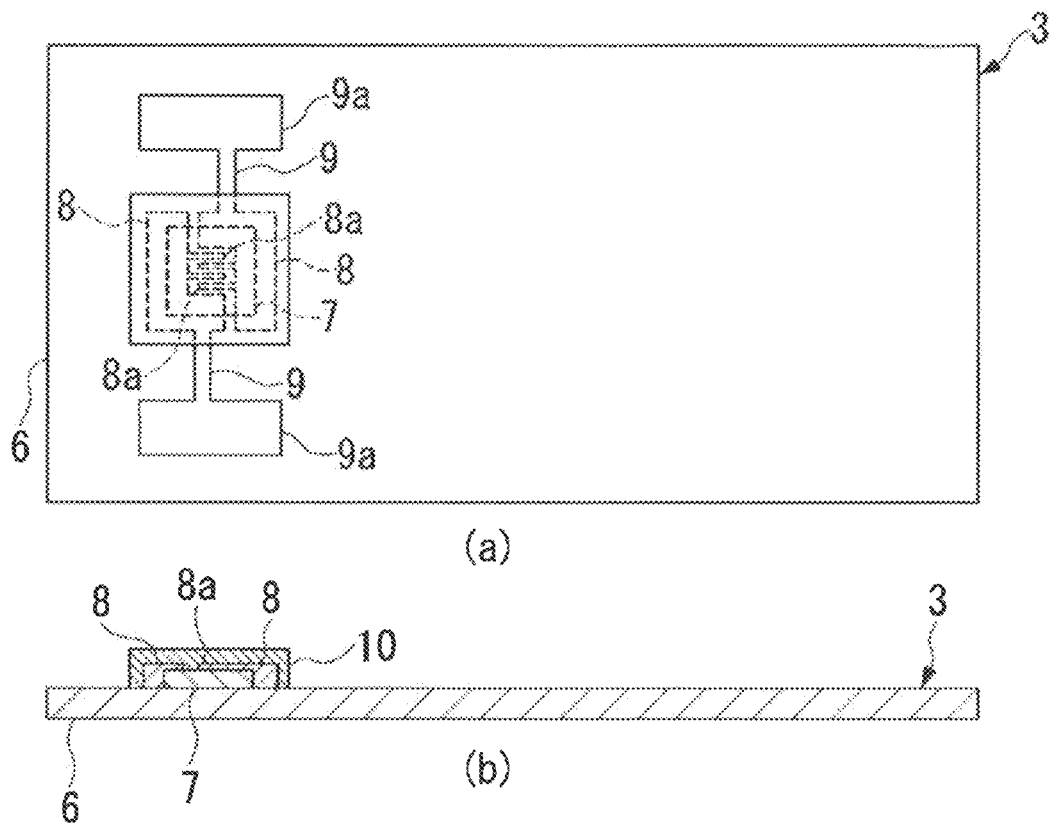
FIG. 2 is an example of a plan view and a cross-sectional view illustrating a sensor portion according to the first embodiment.

As shown in FIGS. 1 and 2, a temperature sensor (1) of the present embodiment includes a pair of lead frames (2), a sensor portion (3) connected to the pair of lead frames (2), and an insulating holding portion (4) which is fixed to the pair of lead frames (2) and holds the lead frames (2).

The pair of lead frames (2) is formed of an alloy such as a copper based alloy, an iron based alloy, stainless, or the like, and is supported by the resin holding portion (4) with the lead frames (2) being held at regular intervals. Note that the pair of lead frames (2) is connected to a pair of lead wires (5) in the holding portion (4). The holding portion (4) has an opening (4a) for attachment.

The sensor portion (3) is a film-type thermistor sensor that includes an insulating film (6); a thin film thermistor portion (7) formed as a pattern on the surface of the insulating film (6) with a thermistor material; a pair of interdigitated electrodes (8) formed as patterns having multiple comb portions (8a) and facing each other on at least one of the top or the bottom of the thin film thermistor portion (7); a pair of pattern electrodes (9) connected to the pair of interdigitated electrodes (8) and formed as patterns on the surface of the insulating film (6); and an insulating protective film (10) for covering the thin film thermistor portion (7) and the interdigitated electrodes (8). An insulating protective sheet (11) covering the thin film thermistor portion (7), the pattern electrodes (9), and the lead frames (2) is adhered to the surface of the insulating film (6).

The pair of lead frames (2) is extended and adhered to the surface of the insulating film (6) disposing the thin film thermistor portion (7) therebetween by an adhesive (not shown) such as a conductive resin adhesive and is connected to the pair of the pattern electrodes (9).

The insulating film (6) is substantially rectangular and is, for example, a polyimide resin sheet formed in a band shape having a thickness from 7.5 to 125 μm. Although the insulating film (6) may also be produced by polyethylene terephthalate (PET), polyethylene naphthalate (PEN), or the like, a polyimide film is preferably used for measuring the temperature of a heating roller because the maximum working temperature thereof is as high as 230° C.

The pair of lead frames (2) extends across substantially the entire length in the extending direction of the insulating film (6) and is adhered to the insulating film (6).

Terminal portions (9a) are provided at the proximal end of the pair of the pattern electrodes (9), and the lead frames (2) are connected to the terminal portions (9a) by a conductive resin adhesive or the like.

The thin film thermistor portion (7) is arranged at one end of the insulating film (6) and is formed of a thermistor material of TiAlN. In particular, the thin film thermistor portion (7) consists of a metal nitride represented by the general formula: $Ti_xAl_yN_z$ (where $0.70 \leq y/(x+y) \leq 0.95$, $0.4 \leq z \leq 0.5$, and $x+y+z=1$), and the crystal structure thereof is a hexagonal wurtzite-type single phase.

Each of the pattern electrodes (9) and the interdigitated electrodes (8) has a bonding layer of Cr or NiCr having a film thickness from 5 to 100 nm formed on the thin film thermistor portion (7) and an electrode layer of a noble metal such as Au having a film thickness from 50 to 1000 nm formed on the bonding layer.

The pair of the interdigitated electrodes (8) is arranged in opposing relation to each other such that the comb portions (8a) are interlocked with one another in an alternating comb-like pattern.

Note that the comb portions (8a) extend along the extending direction (the extending direction of the lead frames (2)) of the insulating film (6). Specifically, temperature measurement is performed with the backside of the insulating film (6) being brought into abutment with the heating roller in rotation. Since the insulating film (6) is bent to a curvature along its extending direction, the bending stresses are also applied to the thin film thermistor portion (7) in the same direction. At this time, the comb portions (8a) extend in the same direction as the insulating film (6), which reinforces the thin film thermistor portion (7), resulting in suppression of occurrence of cracks.

The distal ends of the pair of pattern electrodes (9) are respectively connected to the interdigitated electrodes (8), and the proximal ends thereof are the terminal portions (9a) which are arranged on the both side sections of the insulating film (6).

The protective film (10) is an insulating resin film or the like, and a polyimide film having a thickness of 20 μm is employed as the protective film (10).

Figure 3:
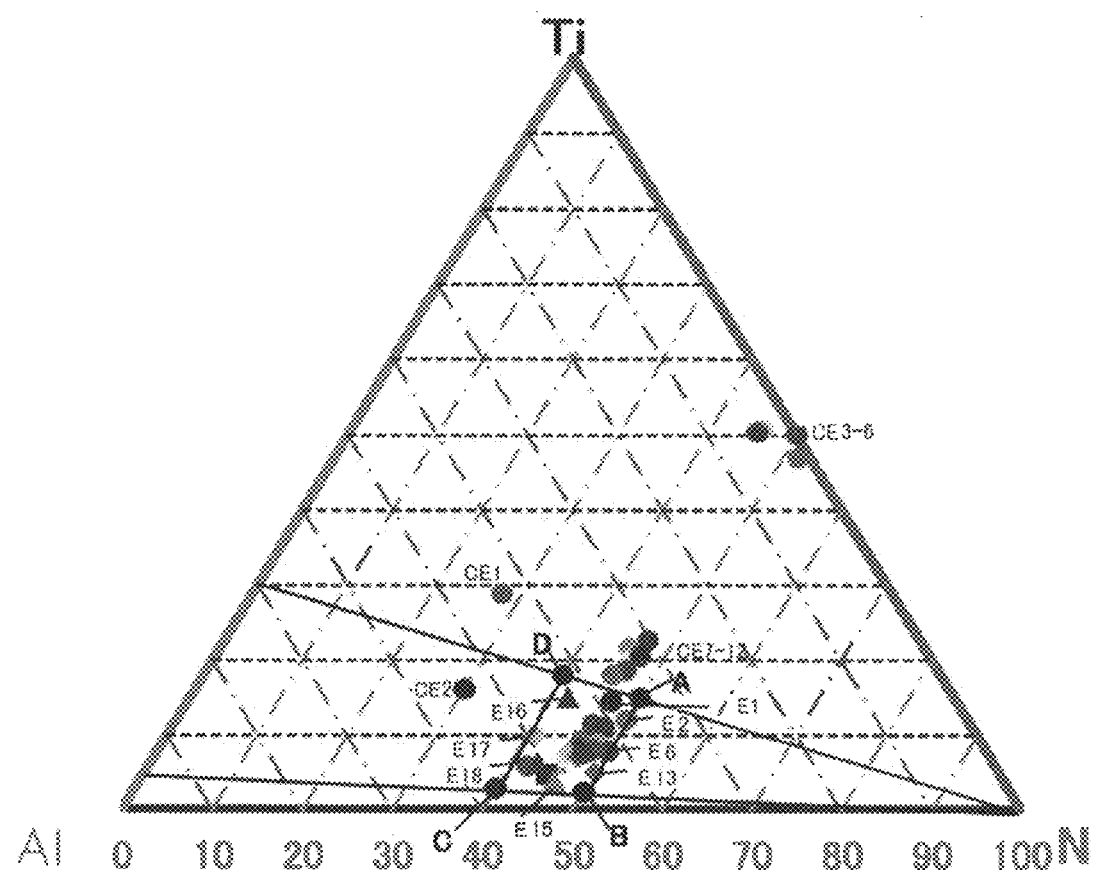
FIG. 3 is a Ti—Al—N-based ternary phase diagram illustrating the composition range of a metal nitride material for a thermistor according to the first embodiment.

As described above, the thin film thermistor portion (7) is a metal nitride material consisting of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a wurtzite-type (space group $P6_3mc$ (No. 186)) single phase having a hexagonal crystal system. Specifically, the metal nitride material has a composition within the region enclosed by the points A, B, C, and D in the Ti—Al—N-based ternary phase diagram as shown in FIG. 3, wherein the crystal phase thereof is a wurtzite-type metal nitride.

Note that the composition ratios (x, y, z) (at %) at the points A, B, C, and D are A (15, 35, 50), B (2.5, 47.5, 50), C (3, 57, 40), and D (18, 42, 40), respectively.

Also, the thin film thermistor portion (7) is formed into the shape of a film having a film thickness from 100 to 1000 nm and is a columnar crystal extending in a vertical direction to the surface of the film. Furthermore, it is preferable that the thin film thermistor portion (7) is strongly oriented along the c-axis more than the a-axis in a vertical direction to the surface of the film.

Note that the decision on whether the thin film thermistor portion (7) has a strong a-axis orientation (100) or a strong c-axis orientation (002) in a vertical direction (film thickness direction) to the surface of the film is determined whether the peak intensity ratio of "the peak intensity of (100)"/"the peak intensity of (002)" is less than 1 by examining the orientation of crystal axis using X-ray diffraction (XRD), where (100) is the Miller index indicating a-axis orientation and (002) is the Miller index indicating c-axis orientation.

Figure 4:
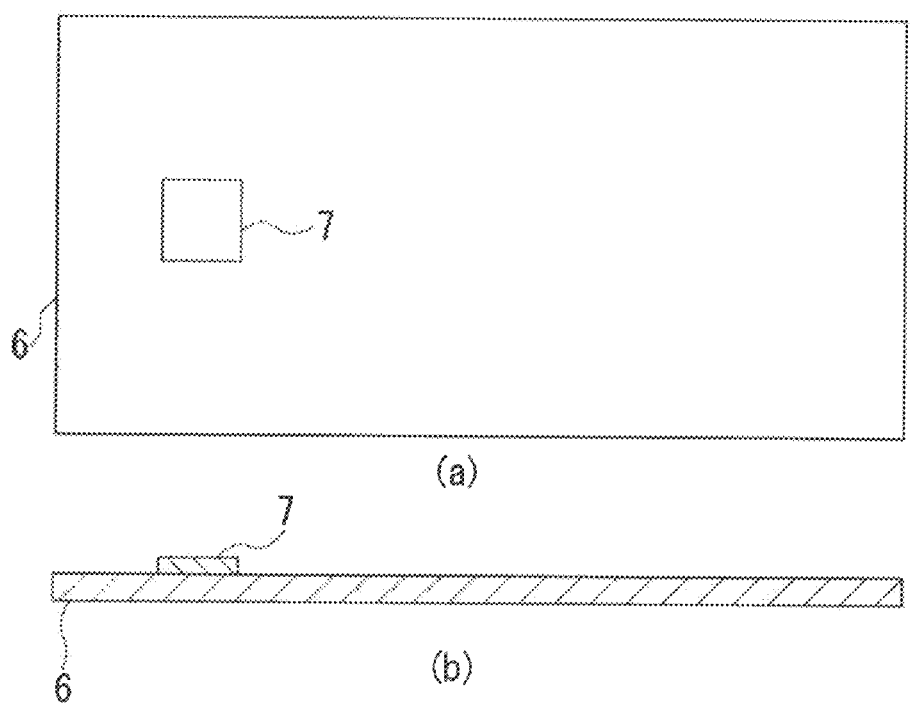
FIG. 4 is an example of a plan view and a cross-sectional view illustrating a step of forming a thin film thermistor portion according to the first embodiment.
Figure 5:
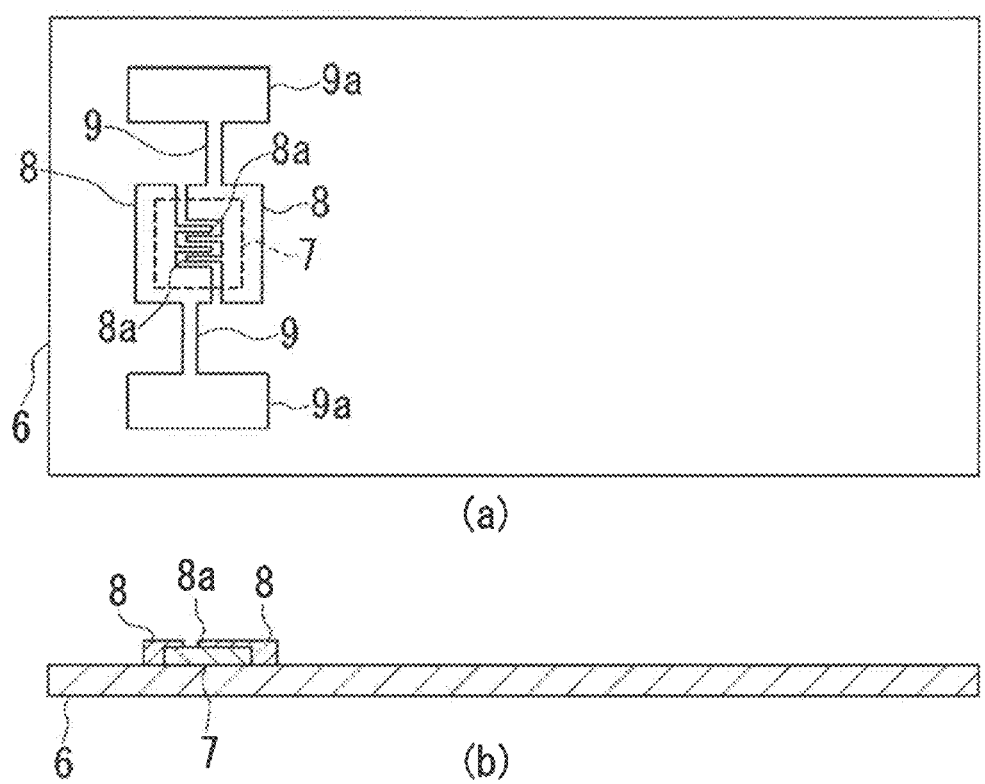
FIG. 5 is an example of a plan view and a cross-sectional view illustrating electrode forming step according to the first embodiment.

A description will be given below of a method for producing the temperature sensor (1) with reference to FIGS. 4 to 6.

The method for producing the temperature sensor (1) of the present embodiment includes a thin film thermistor portion forming step of patterning a thin film thermistor portion (7) on an insulating film (6); an electrode forming step of patterning a pair of pattern electrodes (9) on the insulating film (6) with a pair of the interdigitated electrodes (8) facing each other being disposed on the thin film thermistor portion (7); a protective film forming step of forming a protective film (10) on the surface of the insulating film (6); and a sheet adhering step of adhering a protective sheet (11) for covering the thin film thermistor portion (7), the interdigitated electrodes (8), the pattern electrodes (9), the protective film (10), and the lead frames (2) to the surface of the insulating film (6).

As a more specific example of such a production method, a thermistor film of $Ti_xAl_yN_z$ (x=9, y=43, z=48) having a film thickness of 200 nm is deposited on the insulating film (6) made of a polyimide film having a thickness of 50 μm using a Ti—Al alloy sputtering target in the reactive sputtering method in a nitrogen-containing atmosphere. The thermistor film is produced under the sputtering conditions of an ultimate degree of vacuum of $5\times10^{-6}$ Pa, a sputtering gas pressure of 0.4 Pa, a target input power (output) of 200 W, and a nitrogen gas fraction under a mixed gas (Ar gas+nitrogen gas) atmosphere of 20%.

A resist solution is coated on the formed thermistor film using a bar coater, and then prebaking is performed for 1.5 minutes at a temperature of 110° C. After being exposed by an exposure device, an unnecessary portion is removed by a developing solution, and then patterning is performed by post baking for 5 minutes at a temperature of 150° C. Then, an unnecessary thermistor film of $Ti_xAl_yN_z$ is subject to wet etching using commercially available Ti etchant, and then the resist is stripped so as to form the thin film thermistor portion (7) in a desired shape as shown in FIG. 4.

Next, a Cr film bonding layer having a film thickness of 20 nm is formed on the thin film thermistor portion (7) and the insulating film (6) in the sputtering method. Furthermore, an Au film electrode layer having a film thickness of 200 nm is formed on the bonding layer in the sputtering method.

Next, a resist solution is coated on the laminated electrode layer using a bar coater, and then prebaking is performed for 1.5 minutes at a temperature of 110° C. After being exposed by an exposure device, an unnecessary portion is removed by a developing solution, and then patterning is performed by post baking for 5 minutes at a temperature of 150° C. Then, an unnecessary electrode portion is subject to wet etching sequentially using commercially available Au etchant and Cr etchant, and then the resist is stripped so as to form desired interdigitated electrodes (8) and pattern electrodes (9) as shown in FIG. 5.

Figure 6:
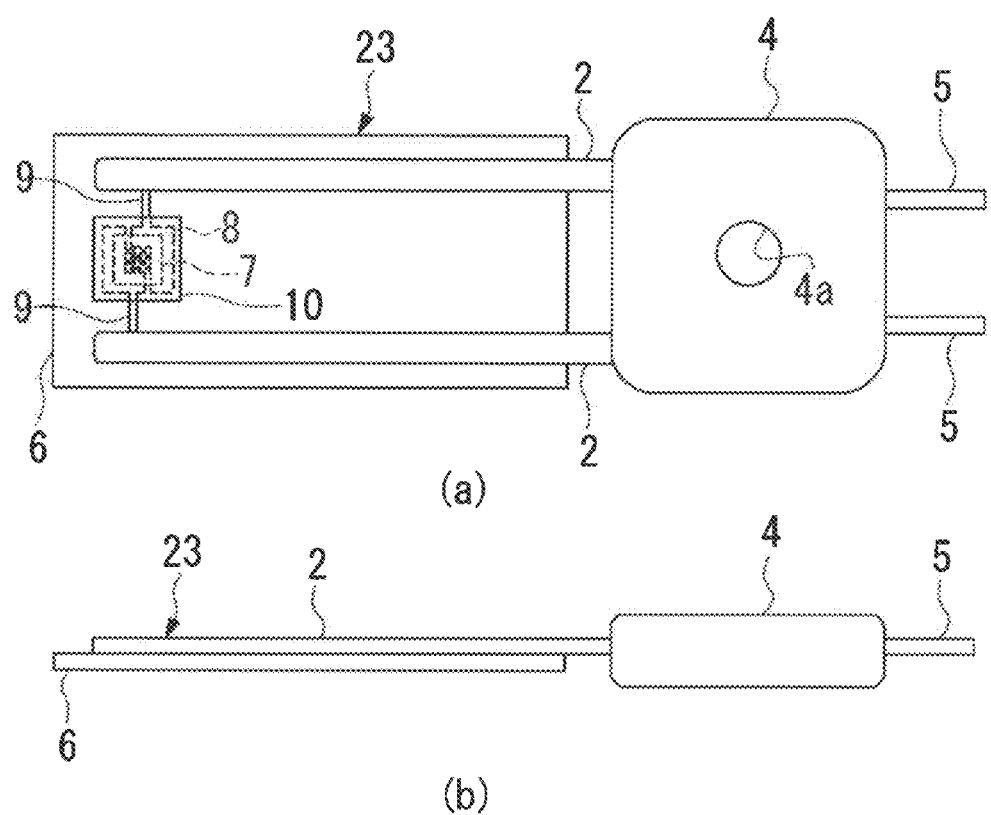
FIG. 6 is an example of a plan view and a front view illustrating a lead frame adhering step according to the first embodiment.

Furthermore, a polyimide varnish is coated on the resulting interdigitated electrodes (8) and pattern electrodes (9) and then is cured for 30 minutes at a temperature of 250° C. to thereby form a polyimide protective film (10) having a thickness of 20 μm as shown in FIG. 6.

Next, as the protective sheet (11), a polyimide film with adhesive agent is adhered to the surface of the insulating film (6) from the lead frames (2) side to thereby produce the temperature sensor (1).

When a plurality of sensor portions (3) is simultaneously produced, the thin film thermistor portion (7), the interdigitated electrodes (8), the pattern electrodes (9), and the protective film (10) are formed in plural on a large sized sheet of the insulating film (6) as described above, and then the resulting laminated large film is cut into a plurality of sensor portions (3).

Since, in the temperature sensor (1) of the present embodiment, the pair of lead frames (2) is extended and adhered to the surface of the insulating film (6) disposing the thin film thermistor portion (7) therebetween, the sensor portion (3) may be supported by the insulating film (6) while ensuring the rigidity thereof. The entire thickness of the temperature sensor (1) may be thinned by the presence of the thin film thermistor portion (7) directly formed on the insulating film (6) supported by the lead frames (2), so that the temperature sensor (1) may exhibit excellent responsiveness in a small volume thereof.

Since the pair of lead frames (2) is connected to the pair of pattern electrodes (9), the thin film thermistor portion (7) and the lead frames (2) are connected to each other via the pattern electrodes (9) directly formed on the insulating film (6), so that the influence of thermal conductivity with the lead frames (2) is suppressed by a patterned thin wiring as compared with the case where the thin film thermistor portion (7) and the lead frames (2) are connected to each other via lead wires or the like. Since the temperature sensor (1) has high flatness over the contact area against a measurement object and thus is brought into surface contact therewith, accurate temperature detection may be achieved and the surface of the measurement object such as a heating roller or the like in rotation is less prone to be damaged.

Furthermore, since the insulating protective sheet (11) covering at least the lead frames (2) is adhered to the surface of the insulating film (6), the lead frames (2) may be stably held by sandwiching it between the insulating film (6) and the protective sheet (11) and the rigidity of the insulating film (6) may improve.

Since the thin film thermistor portion (7) consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a wurtzite-type single phase having a hexagonal crystal system, the metal nitride material having a good B constant and exhibiting excellent heat resistance may be obtained without baking.

Since the metal nitride material is a columnar crystal extending in a vertical direction to the surface of the film, the crystallinity of the film is high, resulting in obtaining high heat resistance.

Furthermore, since the metal nitride material is strongly oriented along the c-axis more than the a-axis in a vertical direction to the surface of the film, the metal nitride material having a high B constant as compared with the case of a strong a-axis orientation is obtained.

Since, in the method for producing the thermistor material layer (the thin film thermistor portion (7)) of the present embodiment, film deposition is performed by the reactive sputtering in a nitrogen-containing atmosphere using a Ti—Al alloy sputtering target, so that the metal nitride material consisting of the above TiAlN can be deposited on a film without baking.

Since a sputtering gas pressure during the reactive sputtering is set to be less than 0.67 Pa, the film made of the metal nitride material, which is strongly oriented along the c-axis more than the a-axis in a vertical direction to the surface of the film, can be formed.

Thus, since, in the temperature sensor (1) of the present embodiment, the thin film thermistor portion (7) is formed in the form of the thermistor material layer on the insulating film (6), the insulating film (6) having low heat resistance, such as a resin film, can be used by the presence of the thin film thermistor portion (7) which is formed without baking and has a high B constant and high heat resistance, so that a thin and flexible thermistor sensor having an excellent thermistor characteristic is obtained.

Conventionally, a substrate material using a ceramics material such as alumina has often been used. For example, if the substrate material is thinned to a thickness of 0.1 mm, the substrate material is very fragile and easily breakable. In the present invention, a film can be used, so that a very thin film-type thermistor sensor (the sensor portion (3)) having a thickness of 0.1 mm can be obtained.

Next, a description will be given below of a temperature sensor according to second and third embodiments of the present invention with reference to FIGS. 7 to 10. In the following embodiments, the same components as those described in the above embodiment are denoted by the same reference numerals, and description thereof is omitted.

While, in the first embodiment, the terminal portions (9a) of the pattern electrodes (9) are arranged at one end of the insulating film (6), the second embodiment is different from the first embodiment in that, in a temperature sensor (21) according to the second embodiment, the pattern electrodes

Figure 7:
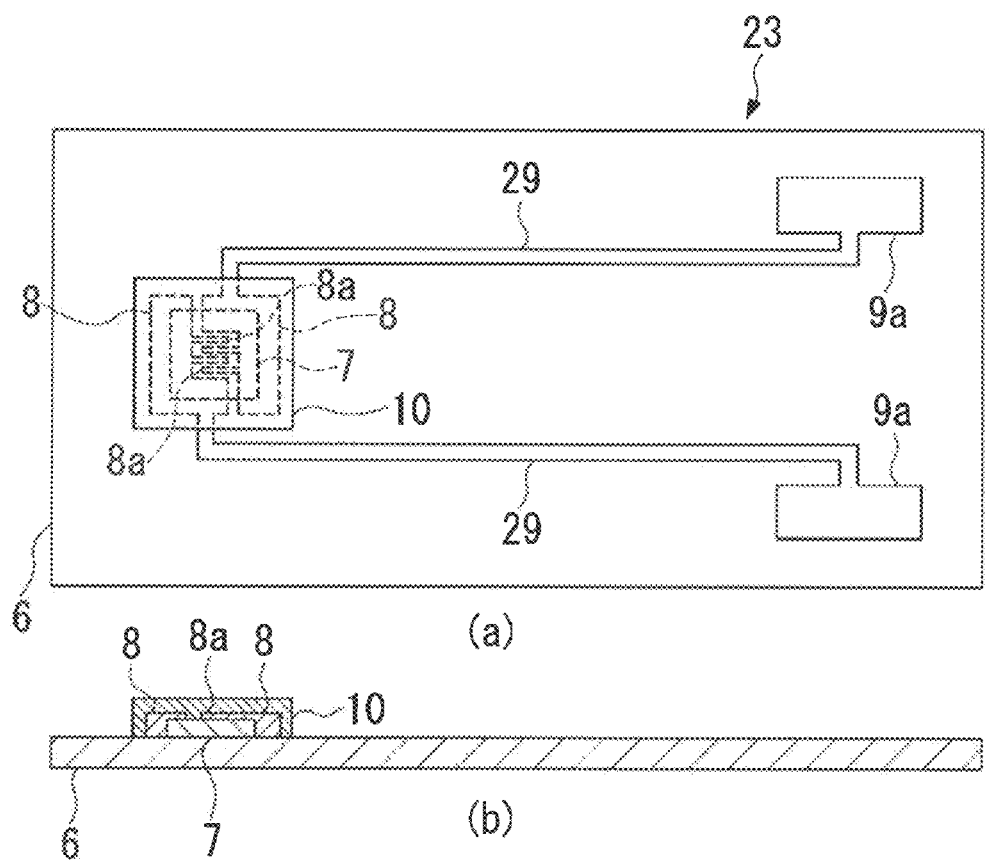
FIG. 7 is an example of a plan view and a cross-sectional view illustrating a sensor portion of a temperature sensor according to a second embodiment of the present invention.
Figure 8:
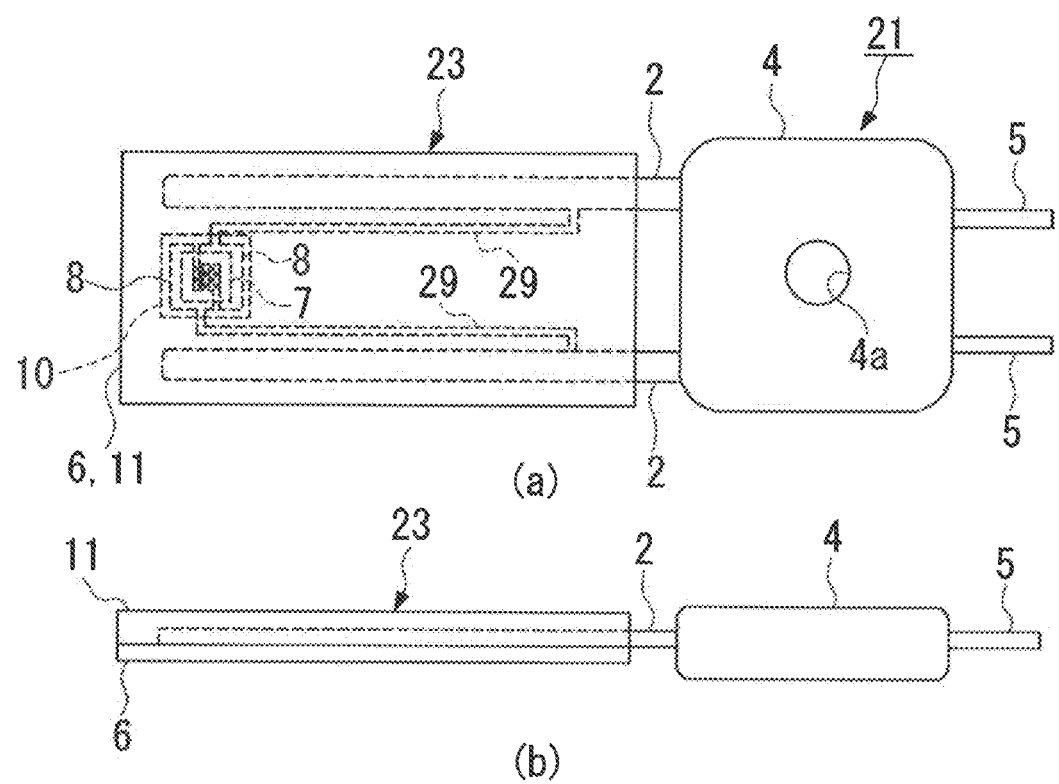
FIG. 8 is an example of a plan view and a front view illustrating the temperature sensor according to the second embodiment.

(29) are formed extending from one end to the other end of the insulating film (6) and are connected to the lead frames (2) at the other end of the insulating film (6) as shown in FIGS. 7 and 8.

Specifically, in the second embodiment, the pattern electrodes (29) of the sensor portion (23) are patterned on the inside of the pair of lead frames (2) so as to extend along the same, and are connected to the lead frames (2) by the terminal portions (9a) which are arranged at the other end of the insulating film (6).

Thus, since, in the temperature sensor (21) in the second embodiment, the pattern electrodes (29) are formed extending from one end to the other end of the insulating film (6) and are connected to the lead frames (2) at the other end of the insulating film (6), respectively, the thin pattern electrodes (29) extend in an elongated manner and the connection between the pattern electrodes (29) and the lead frames (2) is set to be away from the thin film thermistor portion, heat transfer to the lead frames (2) may further be suppressed, resulting in highly accurate temperature measurement with excellent responsiveness.

Figure 9:
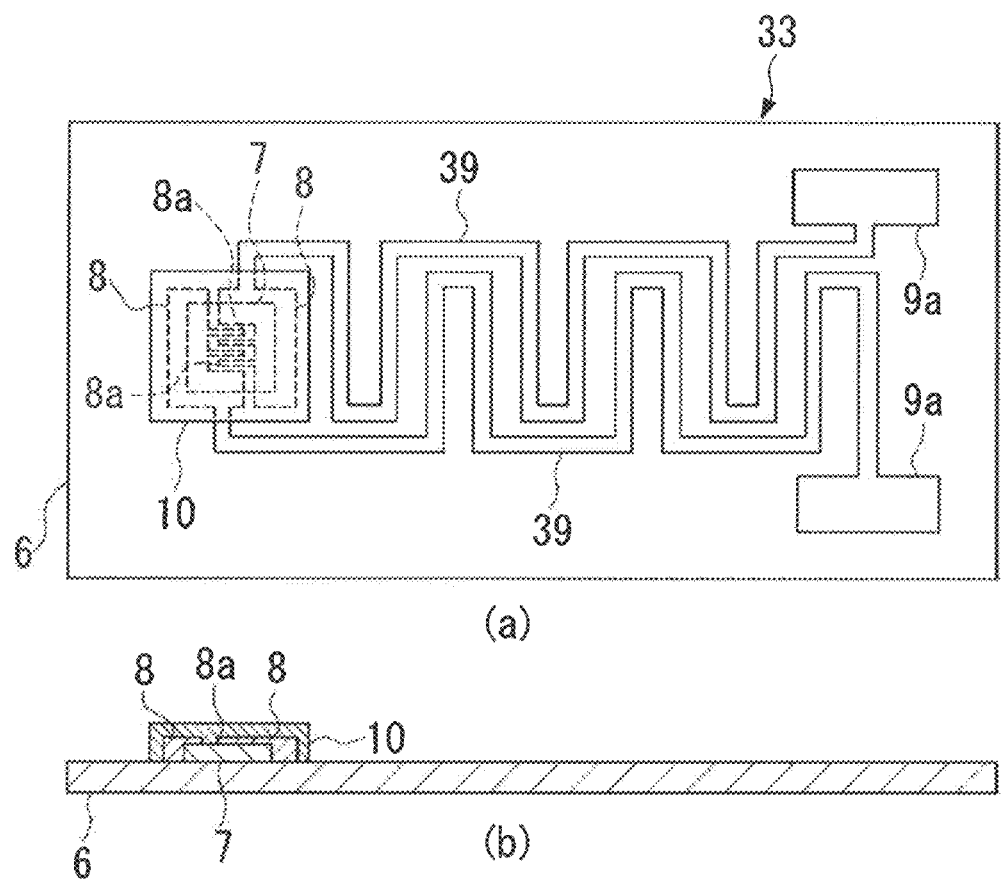
FIG. 9 is an example of a plan view and a cross-sectional view illustrating a sensor portion of a temperature sensor according to a third embodiment of the present invention.
Figure 10:
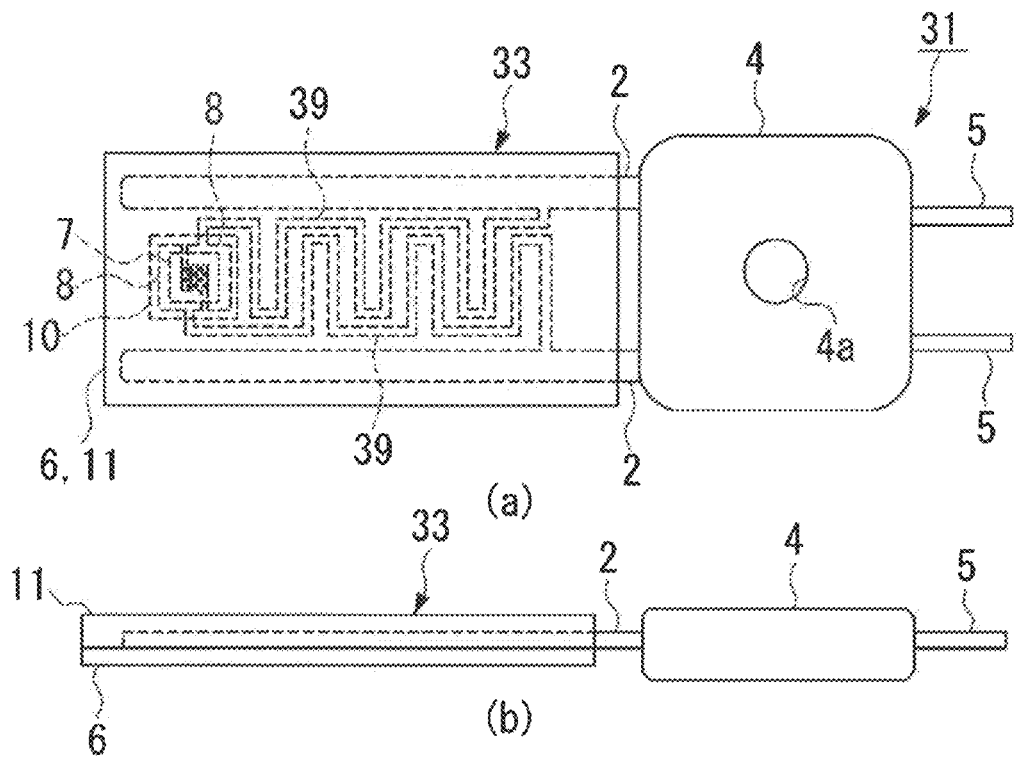
FIG. 10 is an example of a plan view and a front view illustrating the temperature sensor according to the third embodiment.

Next, while the pattern electrodes (29) extend linearly in the second embodiment, the third embodiment is different from the second embodiment in that, a temperature sensor (31) according to the third embodiment has a sensor portion (33) in which pattern electrodes (39) extends in a meander shape as shown in FIGS. 9 and 10.

Specifically, in the third embodiment, the pattern electrodes (39) are repeatedly folded back in a zigzag pattern extending from one end to the other end of the insulating film (6), so that the pattern electrodes (39) are longer than the linear pattern electrodes (9).

Thus, since, in the temperature sensor (31) in the third embodiment, the pair of pattern electrodes (39) is formed in a meander shape, the length of the pattern electrodes (39) increases, resulting in suppression of thermal conductivity to the lead frames (2).

EXAMPLES

Figure 11:
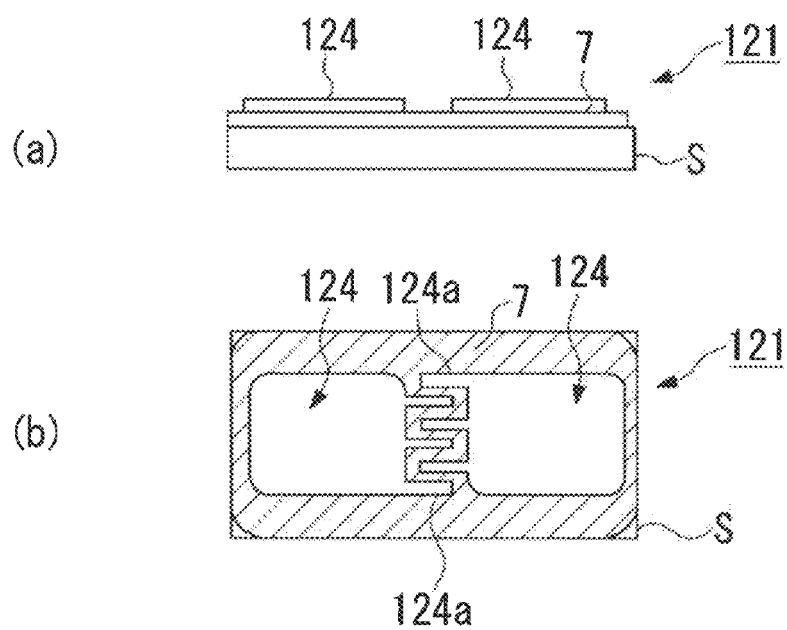
FIG. 11 is a front view and a plan view illustrating a film evaluation element for a metal nitride material for a thermistor according to Example of a temperature sensor of the present invention.

Next, the evaluation results of Examples produced based on the above embodiment with regard to the temperature sensor according to the present invention will be specifically described with reference to FIGS. 11 to 19.
<Production of Film Evaluation Element>
Film evaluation elements (121) shown in FIG. 11 were produced as follows as Examples and Comparative Examples for evaluating the thermistor material layer (the thin film thermistor portion (7)) of the present invention.

Firstly, each of the thin film thermistor portions (7) having a thickness of 500 nm, which were made of metal nitride materials formed with various composition ratios as shown in Table 1, was formed on a Si wafer with a thermal oxidation film as a Si substrate S by using Ti—Al alloy targets formed with various composition ratios in the reactive sputtering method. The thin film thermistor portions (7) were produced under the sputtering conditions of an ultimate degree of vacuum of $5 \times 10^{-6}$ Pa, a sputtering gas pressure of from 0.1 to 1 Pa, a target input power (output) of from 100 to 500 W, and a nitrogen gas fraction under a mixed gas (Ar gas+nitrogen gas) atmosphere of from 10 to 100%.

Next, a Cr film having a thickness of 20 nm was formed on the thin film thermistor portion (7) and an Au film having a thickness of 100 nm was further formed thereon by the sputtering method. Furthermore, a resist solution was coated on the laminated metal films using a spin coater, and then prebaking was performed for 1.5 minutes at a temperature of 110° C. After being exposed by an exposure device, an unnecessary portion was removed by a developing solution, and then patterning was performed by post baking for 5 minutes at a temperature of 150° C. Then, an unnecessary electrode portion was subject to wet etching using commercially available Au etchant and Cr etchant, and then the resist was stripped so as to form a pair of the pattern electrodes (124) each having a desired interdigitated electrode portion (124a). Then, the resulting elements were diced into chip elements so as to obtain film evaluation elements (121) for evaluating a B constant and for testing heat resistance.

Note that Comparative Examples in which the film evaluation elements (121) respectively have the composition ratios of $Ti_xAl_yN_z$ outside the range of the present invention and have different crystal systems were similarly produced for comparative evaluation.
<Film Evaluation>
(1) Composition Analysis The elemental analysis for the thin film thermistor portion (7) obtained by the reactive sputtering method was performed by X-ray photoelectron spectroscopy (XPS). In the XPS, a quantitative analysis was performed for a sputtering surface up to a depth of 20 nm from the outermost surface by Ar sputtering. The results are shown in Table 1. In the following tables, the composition ratio is represented by "at %".

In the X-ray photoelectron spectroscopy (XPS), a quantitative analysis was performed under the conditions of an X-ray source of MgKα (350 W), a path energy of 58.5 eV, a measurement interval of 0.125 eV, a photo-electron take-off angle with respect to a sample surface of 45 deg, and an analysis area of about 800 μmφ. For the quantification accuracy, the quantification accuracy of N/(Ti+Al+N) was ±2%, and the quantification accuracy of Al/(Ti+Al) was ±1%.
(2) Specific Resistance Measurement The specific resistance of each of the thin film thermistor portions (7) obtained by the reactive sputtering method was measured by the four-probe method at a temperature of 25° C. The results are shown in Table 1.
(3) Measurement of B Constant The resistance value for each of the film evaluation elements (121) at temperatures of 25° C. and 50° C. was measured in a constant temperature bath, and a B constant was calculated based on the resistance values at temperatures of 25° C. and 50° C. The results are shown in Table 1.

In the B constant calculating method of the present invention, the B constant is calculated by the following formula using the resistance values at temperatures of 25° C. and 50° C.

$$B \text{ constant } (K) = ln(R25/R50)/(1/T25 - 1/T50)$$

R25 (Ω): resistance value at 25° C.
R50 (Ω): resistance value at 50° C.
T25 (K): 298.15 K which is absolute temperature of 25° C. expressed in Kelvin
T50 (K): 323.15 K which is absolute temperature of 50° C. expressed in Kelvin As can be seen from these results, a thermistor characteristic having a resistivity of 100 Ωcm or greater and a B constant of 1500 K or greater is achieved in all Examples in which the composition ratio of $Ti_xAl_yN_z$ falls within the region enclosed by the points A, B, C, and D in the Ti—Al—N-based ternary phase diagram as shown in FIG. 3, i.e., the region where "$0.70 \leq y/(x+y) \leq 0.95$, $0.4 \leq z \leq 0.5$, and $x+y+z=1$".

Figure 12:
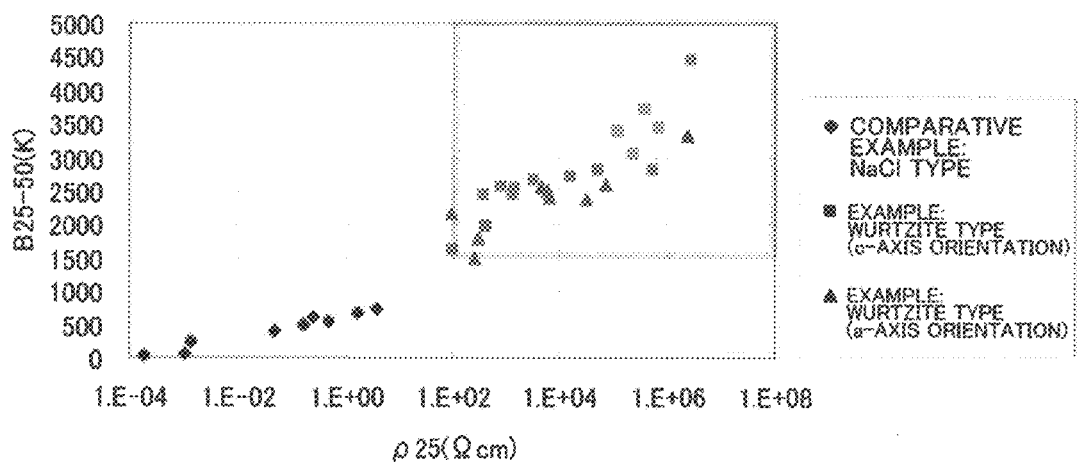
FIG. 12 is a graph illustrating the relationship between a resistivity at 25° C. and a B constant according to Examples and Comparative Example of the present invention.
Figure 13:
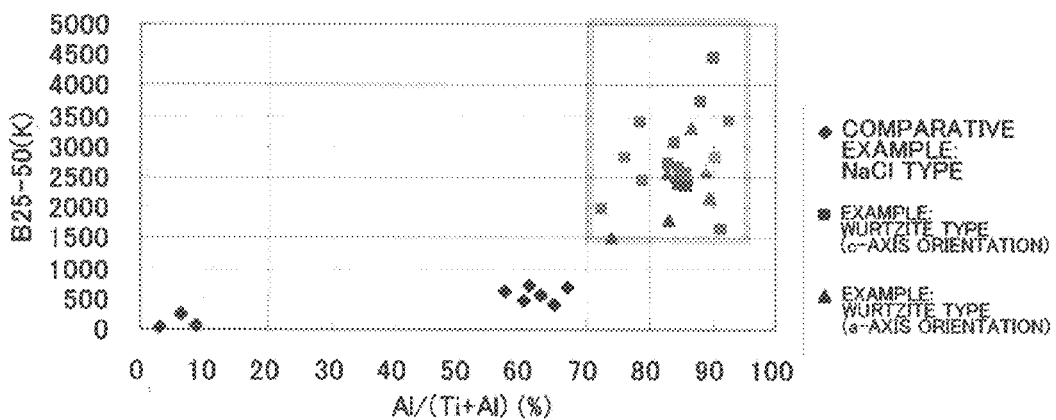
FIG. 13 is a graph illustrating the relationship between the $Al/(Ti+Al)$ ratio and the B constant according to Examples and Comparative Example of the present invention.

From the above results, a graph illustrating the relationship between a resistivity at 25° C. and a B constant is shown in FIG. 12. Also, a graph illustrating the relationship between the Al/(Ti+Al) ratio and the B constant is shown in FIG. 13. From these graphs, the film evaluation elements (121) which fall within the region where Al/(Ti+Al) is from 0.7 to 0.95 and N/(Ti+Al+N) is from 0.4 to 0.5 and the crystal system thereof is a hexagonal wurtzite-type single phase have a specific resistance value at a temperature of 25° C. of 100 Ωcm or greater and a B constant of 1500 K or greater, and thus, fall within the region of high resistance and high B constant. In data shown in FIG. 13, the reason why the B constant varies with respect to the same Al/(Ti+Al) ratio is because the film evaluation elements (121) have different amounts of nitrogen in their crystals.

Comparative Examples 3 to 12 shown in Table 1 fall within the region where Al/(Ti+Al)<0.7, and the crystal system thereof is a cubic NaCl-type phase. In Comparative Example 12 (Al/(Ti+Al)=0.67), a NaCl-type phase and a wurtzite-type phase coexist. Thus, the region where Al/(Ti+Al)<0.7 exhibits a specific resistance value at a temperature of 25° C. of less than 100 Ωcm and a B constant of less than 1500 K, and thus, is a region of low resistance and low B constant.

Comparative Examples 1 and 2 shown in Table 1 fall within the region where N/(Ti+Al+N) is less than 40%, and thus, are in a crystal state where nitridation of metals contained therein is insufficient. Comparative Examples 1 and 2 were neither a NaCl-type nor a wurtzite-type and had very poor crystallinity. In addition, it was found that Comparative Examples 1 and 2 exhibited near-metallic behavior because both the B constant and the resistance value were very small.

(4) Thin Film X-Ray Diffraction (Identification of Crystal Phase)

The crystal phases of the thin film thermistor portions (7) obtained by the reactive sputtering method were identified by Grazing Incidence X-ray Diffraction. The thin film X-ray diffraction is a small angle X-ray diffraction experiment. Measurement was performed under the condition of a Cu X-ray tube, the angle of incidence of 1 degree, and 2θ of from 20 to 130 degrees.

As a result of measurement, a wurtzite-type phase (hexagonal, the same phase as that of AlN) was obtained in the region where Al/(Ti+Al)≥0.7, whereas a NaCl-type phase (cubic, the same phase as that of TiN) was obtained in the region where Al/(Ti+Al)<0.65. A crystal phase in which a wurtzite-type phase and a NaCl-type phase coexist was obtained in the region where 0.65<Al/(Ti+Al)<0.7.

Thus, in the Ti—Al—N-based metal nitride material, the region of high resistance and high B constant exists in the wurtzite-type phase where Al/(Ti+Al)≥0.7. In Examples of the present invention, no impurity phase was confirmed and the crystal structure thereof was a wurtzite-type single phase.

In Comparative Examples 1 and 2 shown in Table 1, the crystal phase thereof was neither a wurtzite-type phase nor a NaCl-type phase as described above, and thus, could not be identified in the testing. In these Comparative Examples, the peak width of XRD was very large, resulting in obtaining materials exhibiting very poor crystallinity. It is contemplated that the crystal phase thereof was a metal phase with insufficient nitridation because Comparative Examples 1 and 2 exhibited near-metallic behavior from the viewpoint of electric properties.

TABLE 1

| | CRYSTAL SYSTEM | WURTZITE TYPE PHASE | XRD PEAK INTENSITY RATIO OF (100)/(002) WHEN CRYSTAL PHASE IS WURTZITE | CRYSTAL AXIS EXHIBITING STRONG DEGREE OF ORIENTATION IN VERTICAL DIRECTION TO SUBSTRATE SURFACE WHEN CRYSTAL PHASE IS WURTZITE TYPE PHASE (a-AXIS OR c-AXIS) | SPUTTERING GAS PRESSURE (Pa) | COMPOSITION RATIO | | | | RESULT OF ELECTRIC PROPERTIES | |
|---|---|---|---|---|---|---|---|---|---|---|---|
| | | | | | | Ti (%) | Al (%) | N (%) | Al/(Ti + Al) (%) | B CONSTANT (K) | SPECIFIC RESISTANCE VALUE AT 25° C. (Ω cm) |
| COMPARATIVE EXAMPLE 1 | UNKNOWN | INSUFFICIENT NITRIDATION | — | — | | 29 | 43 | 28 | 60 | <0 | 2.E−04 |
| COMPARATIVE EXAMPLE 2 | UNKNOWN | INSUFFICIENT NITRIDATION | — | — | | 16 | 54 | 30 | 77 | 25 | 4.E−04 |
| COMPARATIVE EXAMPLE 3 | NaCl TYPE | — | — | — | | 50 | 0 | 50 | 0 | <0 | 2.E−05 |
| COMPARATIVE EXAMPLE 4 | NaCl TYPE | — | — | — | | 47 | 1 | 52 | 3 | 30 | 2.E−04 |
| COMPARATIVE EXAMPLE 5 | NaCl TYPE | — | — | — | | 51 | 3 | 48 | 6 | 248 | 1.E−03 |
| COMPARATIVE EXAMPLE 6 | NaCl TYPE | — | — | — | | 50 | 5 | 45 | 9 | 69 | 1.E−03 |
| COMPARATIVE EXAMPLE 7 | NaCl TYPE | — | — | — | | 23 | 30 | 47 | 57 | 622 | 3.E−01 |

TABLE 1-continued

| | CRYSTAL SYSTEM | XRD PEAK INTENSITY RATIO OF (100)/(002) WHEN CRYSTAL PHASE IS WURTZITE TYPE PHASE | CRYSTAL AXIS EXHIBITING STRONG DEGREE OF ORIENTATION IN VERTICAL DIRECTION TO SUBSTRATE SURFACE WHEN CRYSTAL PHASE IS WURTZITE TYPE PHASE (a-AXIS OR c-AXIS) | SPUTTERING GAS PRESSURE (Pa) | COMPOSITION RATIO | | | | RESULT OF ELECTRIC PROPERTIES | |
|---|---|---|---|---|---|---|---|---|---|---|
| | | | | | Ti (%) | Al (%) | N (%) | Al/(Ti + Al) (%) | B CONSTANT (K) | SPECIFIC RESISTANCE VALUE AT 25° C. (Ω cm) |
| COMPARATIVE EXAMPLE 8 | NaCl TYPE | — | | — | 22 | 33 | 45 | 80 | 477 | 2.E−01 |
| COMPARATIVE EXAMPLE 9 | NaCl TYPE | — | | — | 21 | 32 | 47 | 61 | 724 | 4.E+00 |
| COMPARATIVE EXAMPLE 10 | NaCl TYPE | — | | — | 20 | 34 | 46 | 83 | 564 | 5.E−01 |
| COMPARATIVE EXAMPLE 11 | NaCl TYPE | — | | — | 19 | 35 | 46 | 85 | 402 | 5.E−02 |
| COMPARATIVE EXAMPLE 12 | NaCl TYPE + WURTZITE TYPE | — | | — | 18 | 37 | 45 | 67 | 665 | 2.E+00 |
| EXAMPLE 1 | WURTZITE TYPE | 0.05 | c-AXIS | <0.67 | 15 | 38 | 47 | 72 | 1980 | 4.E+02 |
| EXAMPLE 2 | WURTZITE TYPE | 0.07 | c-AXIS | <0.67 | 12 | 38 | 50 | 76 | 2798 | 5.E+04 |
| EXAMPLE 3 | WURTZITE TYPE | 0.45 | c-AXIS | <0.67 | 11 | 42 | 47 | 79 | 3385 | 1.E+05 |
| EXAMPLE 4 | WURTZITE TYPE | <0.01 | c-AXIS | <0.67 | 11 | 41 | 48 | 79 | 2437 | 4.E+02 |
| EXAMPLE 5 | WURTZITE TYPE | 0.34 | c-AXIS | <0.67 | 9 | 43 | 48 | 83 | 2727 | 2.E+04 |
| EXAMPLE 6 | WURTZITE TYPE | <0.01 | c-AXIS | <0.67 | 8 | 42 | 50 | 84 | 3057 | 2.E+05 |
| EXAMPLE 7 | WURTZITE TYPE | 0.08 | c-AXIS | <0.67 | 8 | 44 | 48 | 84 | 2665 | 3.E+03 |
| EXAMPLE 8 | WURTZITE TYPE | 0.05 | c-AXIS | <0.67 | 8 | 44 | 48 | 85 | 2527 | 1.E+03 |
| EXAMPLE 9 | WURTZITE TYPE | <0.01 | c-AXIS | <0.67 | 8 | 45 | 47 | 86 | 2557 | 8.E+02 |
| EXAMPLE 10 | WURTZITE TYPE | 0.04 | c-AXIS | <0.67 | 7 | 46 | 46 | 86 | 2449 | 1.E+03 |
| EXAMPLE 11 | WURTZITE TYPE | 0.24 | c-AXIS | <0.67 | 7 | 48 | 65 | 88 | 3729 | 4.E+05 |
| EXAMPLE 12 | WURTZITE TYPE | 0.73 | c-AXIS | <0.67 | 5 | 49 | 46 | 90 | 2798 | 5.E+05 |
| EXAMPLE 13 | WURTZITE TYPE | <0.01 | c-AXIS | <0.67 | 5 | 45 | 50 | 90 | 4449 | 3.E+06 |
| EXAMPLE 14 | WURTZITE TYPE | 0.38 | c-AXIS | <0.67 | 5 | 50 | 45 | 91 | 1821 | 1.E+02 |
| EXAMPLE 15 | WURTZITE TYPE | 0.13 | c-AXIS | <0.67 | 4 | 50 | 46 | 93 | 3439 | 6.E+05 |
| EXAMPLE 16 | WURTZITE TYPE | 3.54 | a-AXIS | ≥0.67 | 15 | 43 | 42 | 74 | 1507 | 3.E+02 |
| EXAMPLE 17 | WURTZITE TYPE | 2.94 | a-AXIS | ≥0.67 | 10 | 49 | 41 | 83 | 1794 | 3.E+02 |
| EXAMPLE 18 | WURTZITE TYPE | 1.05 | a-AXIS | ≥0.67 | 6 | 52 | 42 | 90 | 2164 | 1.E+02 |
| EXAMPLE 19 | WURTZITE TYPE | 2.50 | a-AXIS | ≥0.67 | 9 | 44 | 47 | 83 | 2571 | 5.E+03 |
| EXAMPLE 20 | WURTZITE TYPE | 9.09 | a-AXIS | ≥0.67 | 8 | 46 | 46 | 84 | 2501 | 6.E+03 |
| EXAMPLE 21 | WURTZITE TYPE | 6.67 | a-AXIS | ≥0.67 | 8 | 45 | 47 | 84 | 2408 | 7.E+03 |
| EXAMPLE 22 | WURTZITE TYPE | 2.22 | a-AXIS | ≥0.67 | 8 | 46 | 46 | 86 | 2364 | 3.E+04 |
| EXAMPLE 23 | WURTZITE TYPE | 1.21 | a-AXIS | ≥0.67 | 7 | 46 | 47 | 87 | 3317 | 2.E+06 |

TABLE 1-continued

| CRYSTAL SYSTEM | CRYSTAL PHASE | XRD PEAK INTENSITY RATIO OF (100)/(002) WHEN CRYSTAL PHASE IS WURTZITE TYPE PHASE | CRYSTAL AXIS EXHIBITING STRONG DEGREE OF ORIENTATION IN VERTICAL DIRECTION TO SUBSTRATE SURFACE WHEN CRYSTAL PHASE IS WURTZITE TYPE PHASE (a-AXIS OR c-AXIS) | SPUTTERING GAS PRESSURE (Pa) | COMPOSITION RATIO | | | | B CONSTANT (K) | RESULT OF ELECTRIC PROPERTIES SPECIFIC RESISTANCE VALUE AT 25° C. (Ω cm) |
|---|---|---|---|---|---|---|---|---|---|---|
| | | | | | Ti (%) | Al (%) | N (%) | Al/(Ti + Al) (%) | | |
| EXAMPLE 24 | WURTZITE TYPE | 3.33 | a-AXIS | ≥0.67 | 6 | 51 | 43 | 89 | 2599 | 7.E+04 |

Next, all of Examples in the present invention were wurtzite-type phase films having strong orientation. Thus, whether the films have strong a-axis orientation or c-axis orientation to the crystal axis in a vertical direction (film thickness direction) to the Si substrate S was examined by XRD. At this time, in order to examine the orientation of crystal axis, the peak intensity ratio of (100)/(002) was measured, where (100) is the Miller index indicating a-axis orientation and (002) is the Miller index indicating c-axis orientation.

Consequently, in Examples in which film deposition was performed at a sputtering gas pressure of less than 0.67 Pa, the intensity of (002) was much stronger than that of (100), so that the films exhibited stronger c-axis orientation than a-axis orientation. On the other hand, in Examples in which film deposition was performed at a sputtering gas pressure of 0.67 Pa or greater, the intensity of (100) was much stronger than that of (002), so that the films exhibited stronger a-axis orientation than c-axis orientation.

Note that it was confirmed that a wurtzite-type single phase was formed in the same manner even when the thin film thermistor portion (7) was deposited on a polyimide film under the same deposition condition. In addition, it was confirmed that the crystal orientation did not change even when the thin film thermistor portion (7) was deposited on a polyimide film under the same deposition condition.

Figure 14:
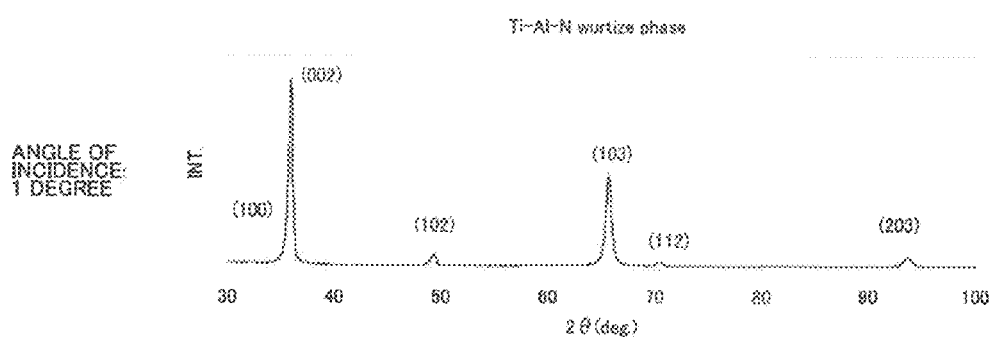
FIG. 14 is a graph illustrating the result of X-ray diffraction (XRD) in the case of a strong c-axis orientation where $Al/(Ti+Al)=0.84$ according to Example of the present invention.

An exemplary XRD profile in Example exhibiting strong c-axis orientation is shown in FIG. 14. In this Example, Al/(Ti+Al) was equal to 0.84 (wurtzite-type, hexagonal), and measurement was performed at the angle of incidence of 1 degree. As can be seen from the result in this Example, the intensity of (002) was much stronger than that of (100).

Figure 15:
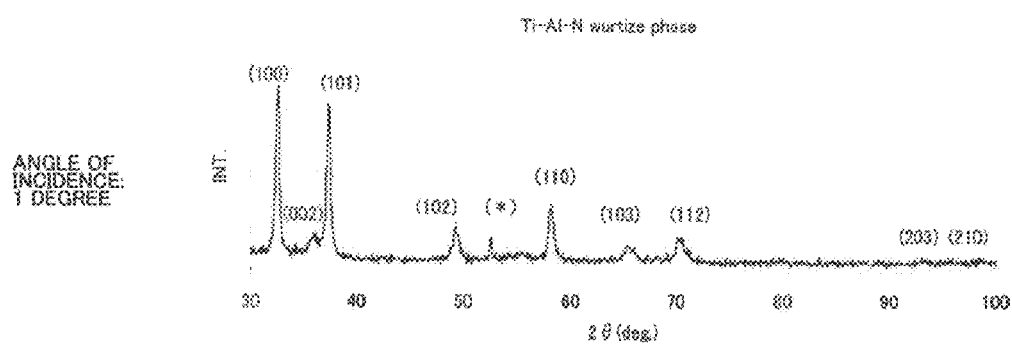
FIG. 15 is a graph illustrating the result of X-ray diffraction (XBD) in the case of a strong a-axis orientation where $Al/(Ti+Al)=0.83$ according to Example of the present invention.

An exemplary XRD profile in Example exhibiting strong a-axis orientation is shown in FIG. 15. In this Example, Al/(Ti+Al) was equal to 0.83 (wurtzite-type, hexagonal), measurement was performed at the angle of incidence of 1 degree. As can be seen from the result in this Example, the intensity of (100) was much stronger than that of (002).

Furthermore, in this Example, symmetrical reflective measurement was performed at the angle of incidence of 0 degrees. The asterisk (*) in the graph was a peak derived from the device, and thus, it was confirmed that the asterisk (*) in the graph is neither a peak derived from the sample itself nor a peak derived from the impurity phase (it can be seen from the fact that the peak indicated by (*) is lost in the symmetrical reflective measurement, and thus, it is a peak derived from the device).

Figure 16:
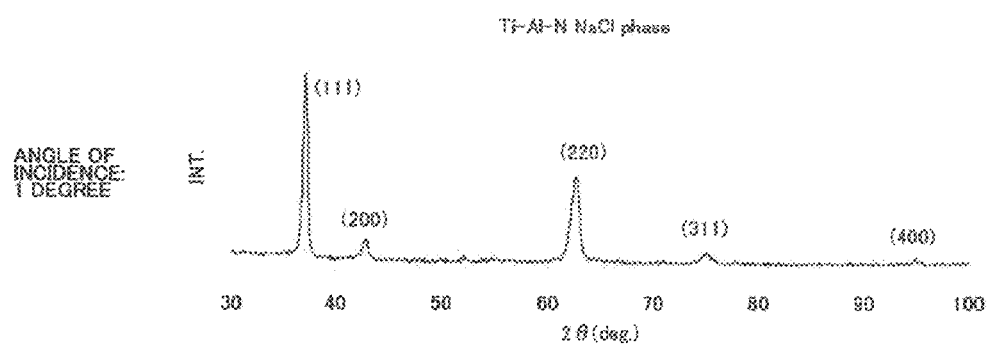
FIG. 16 is a graph illustrating the result of X-ray diffraction (XRD) in the case where $Al/(Ti+Al)=0.60$ according to Comparative Example of the present invention.

An exemplary XRD profile in Comparative Example is shown in FIG. 16. In this Comparative Example, Al/(Ti+Al) was equal to 0.6 (NaCl type, cubic), and measurement was performed at the angle of incidence of 1 degree. No peak which could be indexed as a wurtzite-type (space group $P6_3mc$ (No. 186)) was detected, and thus, this Comparative Example was confirmed as a NaCl-type single phase.

Next, the correlation between a crystal structure and its electric properties was compared in detail with each other with regard to Examples of the present invention in which the wurtzite-type materials were employed.

Figure 17:
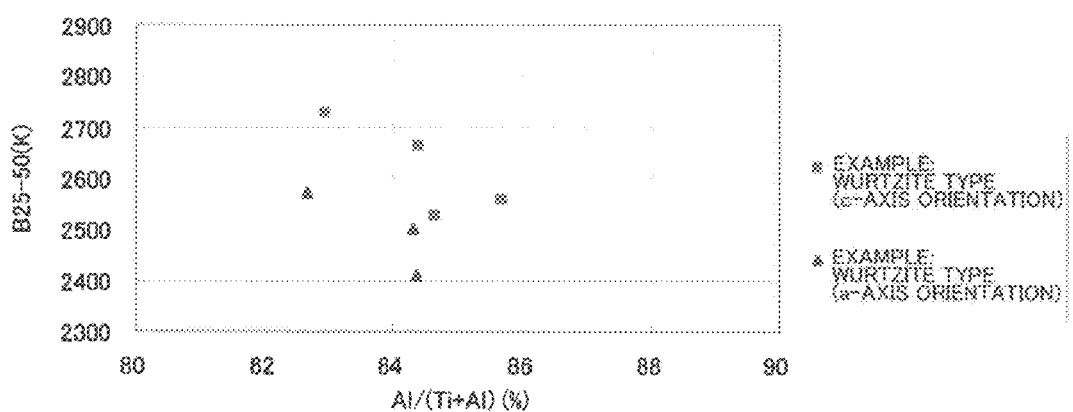
FIG. 17 is a graph illustrating the relationship between the $Al/(Ti+Al)$ ratio and the B constant obtained by comparing Example revealing a strong a-axis orientation and Example revealing a strong c-axis orientation according to Examples of the present invention.

As shown in Table 2 and FIG. 17, there were materials (Examples 5, 7, 8, and 9) of which the crystal axis is strongly oriented along a c-axis in a vertical direction to the surface of the substrate and materials (Examples 19, 20, and 21) of which the crystal axis is strongly oriented along an a-axis in a vertical direction to the surface of the substrate despite the fact that they have substantially the same Al/(Ti+Al) ratio.

When both groups were compared to each other, it was found that the materials having a strong c-axis orientation had a greater B constant by about 100 K than that of the materials having a strong a-axis orientation upon the same Al/(Ti+Al) ratio. When focus was placed on the amount of N (N/(Ti+Al+N)), it was found that the materials having a strong c-axis orientation had a slightly larger amount of nitrogen than that of the materials having a strong a-axis orientation. Since the ideal stoichiometric ratio of N/(Ti+Al+N) is 0.5, it was found that the materials having a strong c-axis orientation were ideal materials due to a small amount of nitrogen defects.

TABLE 2

| | CRYSTAL SYSTEM | XRD PEAK INTENSITY RATIO OF (100)/(002) WHEN CRYSTAL PHASE IS WURTZITE TYPE PHASE | CRYSTAL AXIS EXHIBITING STRONG DEGREE OF ORIENTATION IN VERTICAL DIRECTION TO SUBSTRATE SURFACE WHEN CRYSTAL PHASE IS WURTZITE TYPE PHASE (a-AXIS OR c-AXIS) | SPUTTERING GAS PRESSURE (Pa) | COMPOSITION RATIO | | | | RESULT OF ELECTRIC PROPERTIES | |
|---|---|---|---|---|---|---|---|---|---|---|
| | | | | | Ti (%) | Al (%) | N (%) | Al/(Ti + Al) (%) | B CONSTANT (K) | SPECIFIC RESISTANCE VALUE AT 25° C. (Ω cm) |
| EXAMPLE 5 | WURTZITE TYPE | 0.34 | c-AXIS | <0.67 | 9 | 43 | 48 | 83 | 2727 | 2.E+04 |
| EXAMPLE 7 | WURTZITE TYPE | 0.09 | c-AXIS | <0.67 | 8 | 44 | 48 | 84 | 2665 | 3.E+03 |
| EXAMPLE 8 | WURTZITE TYPE | 0.05 | c-AXIS | <0.67 | 8 | 44 | 48 | 85 | 2527 | 1.E+03 |
| EXAMPLE 9 | WURTZITE TYPE | <0.01 | c-AXIS | <0.67 | 8 | 45 | 47 | 86 | 2557 | 8.E+02 |
| EXAMPLE 19 | WURTZITE TYPE | 2.50 | a-AXIS | ≥0.67 | 9 | 44 | 47 | 83 | 2571 | 5.E+03 |
| EXAMPLE 20 | WURTZITE TYPE | 9.09 | a-AXIS | ≥0.67 | 8 | 46 | 46 | 84 | 2501 | 6.E+03 |
| EXAMPLE 21 | WURTZITE TYPE | 6.67 | a-AXIS | ≥0.67 | 8 | 45 | 47 | 84 | 2408 | 7.E+03 |

<Crystal Form Evaluation>

Figure 18:
FIG. 18 is a cross-sectional SEM photograph illustrating Example revealing a strong c-axis orientation according to Example of the present invention.
Figure 19:
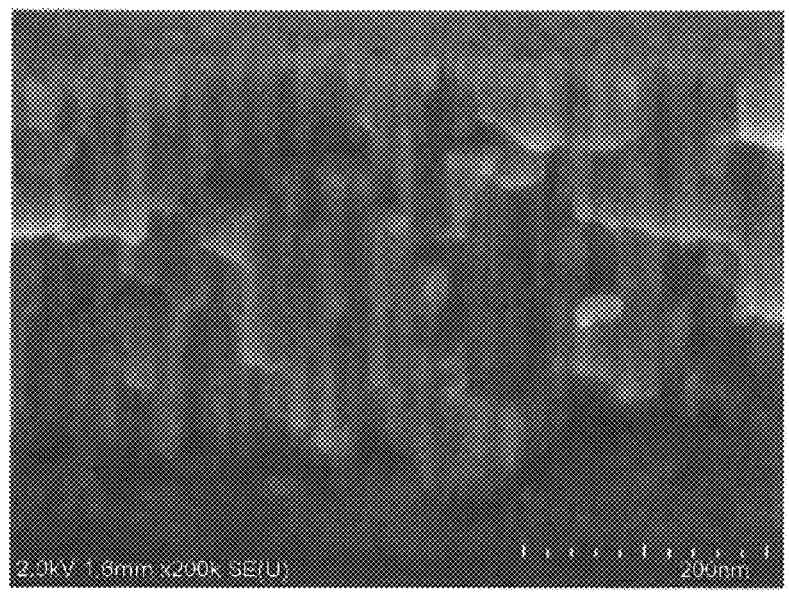
FIG. 19 is a cross-sectional SEM photograph illustrating Example revealing a strong a-axis orientation according to Example of the present invention.

Next, as an exemplary crystal form in the cross-section of the thin film thermistor portion (7), a cross-sectional SEM photograph of the thin film thermistor portion (7) in Example (Al/(Ti+Al)=0.84, wurtzite-type, hexagonal, and strong c-axis orientation) in which the thin film thermistor portion (7) was deposited on the Si substrate S with a thermal oxidation film is shown in FIG. 18. Also, a cross-sectional SEM photograph of the thin film thermistor portion (7) in another Example (Al/(Ti+Al)=0.83, wurtzite-type, hexagonal, and strong a-axis orientation) is shown in FIG. 19.

The samples in these Examples were obtained by breaking the Si substrates S by cleaving them. The photographs were taken by tilt observation at the angle of 45 degrees.

As can be seen from these photographs, samples were formed of a high-density columnar crystal in both Examples. Specifically, the growth of columnar crystal in a direction perpendicular to the surface of the substrate was observed in Example revealing a strong c-axis orientation and another Example revealing a strong a-axis orientation. Note that the break of the columnar crystal was generated upon breaking the Si substrate S by cleaving it.

<Film Heat Resistance Test Evaluation>

In Examples and Comparative Example shown in Table 1, a resistance value and a B constant before and after the heat resistance test at a temperature of 125° C. for 1000 hours in air were evaluated. The results are shown in Table 3. Comparative Example made by a conventional Ta—Al—N-based material was also evaluated in the same manner for comparison.

As can be seen from these results, although the Al concentration and the nitrogen concentration vary, the heat resistance of the Ti—Al—N-based material based on the electric properties change before and after the heat resistance test is better than the Ta—Al—N-based material in Comparative Example when comparison is made by using the same B constant. Note that the materials used in Examples 5 and 8 have a strong c-axis orientation and the materials used in Examples 21 and 24 have a strong a-axis orientation. When both groups were compared to each other, the heat resistance of Examples revealing a strong c-axis orientation is slightly improved as compared with that of Examples revealing a strong a-axis orientation.

Note that, in the Ta—Al—N-based material, ionic radius of Ta is very large compared to that of Ti and Al, and thus, a wurtzite-type phase cannot be produced in the high-concentration Al region. It is contemplated that the Ti—Al—N-based material having the wurtzite-type phase has better heat resistance than the Ta—Al—N-based material because the Ta—Al—N-based material is not the wurtzite-type phase.

TABLE 3

| | M ELEMENT | M (%) | Al (%) | N (%) | Al/(M + Al) (%) | B25-50 (K) | SPECIFIC RESISTANCE VALUE AT 25° C. ($\Omega$ cm) | RISING RATE OF SPECIFIC RESISTANCE AT 25° C. AFTER HEAT RESISTANCE TEST AT 125° C. FOR 1,000 HOURS (%) | RISING RATE OF CONSTANT B AFTER HEAT RESISTANCE TEST AT 125° C. FOR 1,000 HOURS (%) |
|---|---|---|---|---|---|---|---|---|---|
| COMPARATIVE EXAMPLE | Ta | 60 | 1 | 39 | 2 | 2671 | 5.E+02 | 25 | 16 |
| EXAMPLE 5 | Ti | 9 | 43 | 48 | 83 | 2727 | 2.E+04 | <4 | <1 |
| EXAMPLE 8 | Ti | 8 | 44 | 48 | 85 | 2527 | 1.E+03 | <4 | <1 |
| EXAMPLE 21 | Ti | 8 | 45 | 47 | 84 | 2408 | 7.E+03 | <5 | <1 |
| EXAMPLE 24 | Ti | 6 | 51 | 43 | 89 | 2599 | 7.E+04 | <5 | <1 |

The technical scope of the present invention is not limited to the aforementioned embodiments and Examples, but the present invention may be modified in various ways without departing from the scope or teaching of the present invention.

REFERENCE NUMERALS

1, 21, and 31: temperature sensor, 2: lead frame, 3, 23, and 33: sensor portion, 6: insulating film, 7: thin film thermistor portion, 8: interdigitated electrode, 8a: comb portion, 9, 29, and 39: pattern electrode, 10: protective film, 11: protective sheet

What is claimed is:

1. A temperature sensor comprising:
   a pair of lead frames;
   a sensor portion connected to the pair of lead frames; and
   an insulating holding portion which is fixed to the pair of lead frames and holds the lead frames,
   wherein the sensor portion further comprises:
   an insulating film;
   a thin film thermistor portion formed as a pattern on the surface of the insulating film with a thermistor material;
   a pair of interdigitated electrodes formed as patterns having multiple comb portions and facing each other on at least one of the top or the bottom of the thin film thermistor portion; and
   a pair of pattern electrodes that respectively have ends connected to the pair of interdigitated electrodes and other ends connected to the pair of lead frames, and are formed as patterns on the surface of the insulating film, and
   wherein the pair of lead frames is extended on both sides of the thin film thermistor portion at a certain interval in the surface of the insulating film.

2. The temperature sensor according to claim 1, wherein the insulating film is generally rectangular, the pair of lead frames extends across substantially the entire length in the extending direction of the insulating film, the thin film thermistor portion is arranged at one end of the insulating film, and the pattern electrodes are formed extending from one end to the other end of the insulating film and are connected to the lead frames at the other end of the insulating film, respectively.

3. The temperature sensor according to claim 2, wherein the pair of pattern electrodes is formed in a meander shape.

4. The temperature sensor according to claim 1, wherein an insulating protective sheet covering at least the lead frames is adhered to the surface of the insulating film.

5. The temperature sensor according to claim 1, wherein the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), and the crystal structure thereof is a hexagonal wurtzite-type single phase.

* * * * *